United States Patent

Haller

[15] 3,643,848
[45] Feb. 22, 1972

[54] GLASS GRIPPING DEVICES
[72] Inventor: Harry Haller, Warley, England
[73] Assignee: Chance Brothers Limited, Warley, England
[22] Filed: Dec. 23, 1969
[21] Appl. No.: 887,582

[30] Foreign Application Priority Data
Jan. 2, 1969 Great Britain ............................ 371/69

[52] U.S. Cl. ........................................................... 226/186
[51] Int. Cl. ........................................................... B65h 11/22
[58] Field of Search .................... 148/127, 167, 208; 214/1 P; 226/186, 187, 176, 177; 225/93.5

[56] References Cited

UNITED STATES PATENTS

| 723,504 | 3/1903 | Titus | 198/208 |
|---|---|---|---|
| 1,806,445 | 5/1931 | Broche | 225/93.5 |
| 3,118,635 | 1/1964 | Landsem | 226/177 |
| 3,502,363 | 3/1970 | Ramsey | 214/1 P |

*Primary Examiner*—Richard E. Aegerter
*Attorney*—Burns, Doane, Swecker and Mathis

[57] ABSTRACT

A device for gripping a moving body of glass comprises two pairs of rollers supported for rotation about parallel axes and which engage between the rollers constituting each pair, opposite surfaces of the moving body of glass. The axes of the rollers are substantially perpendicular to the direction of glass movement and two tie members interconnect the ends of the rollers of each pair, the tie members being pivotable about their axes which are parallel to the roller axes, and biassing means are provided to bias the members about the pivot axes so that the moving body of glass is gripped.

2 Claims, 1 Drawing Figure

PATENTED FEB 22 1972
3,643,848
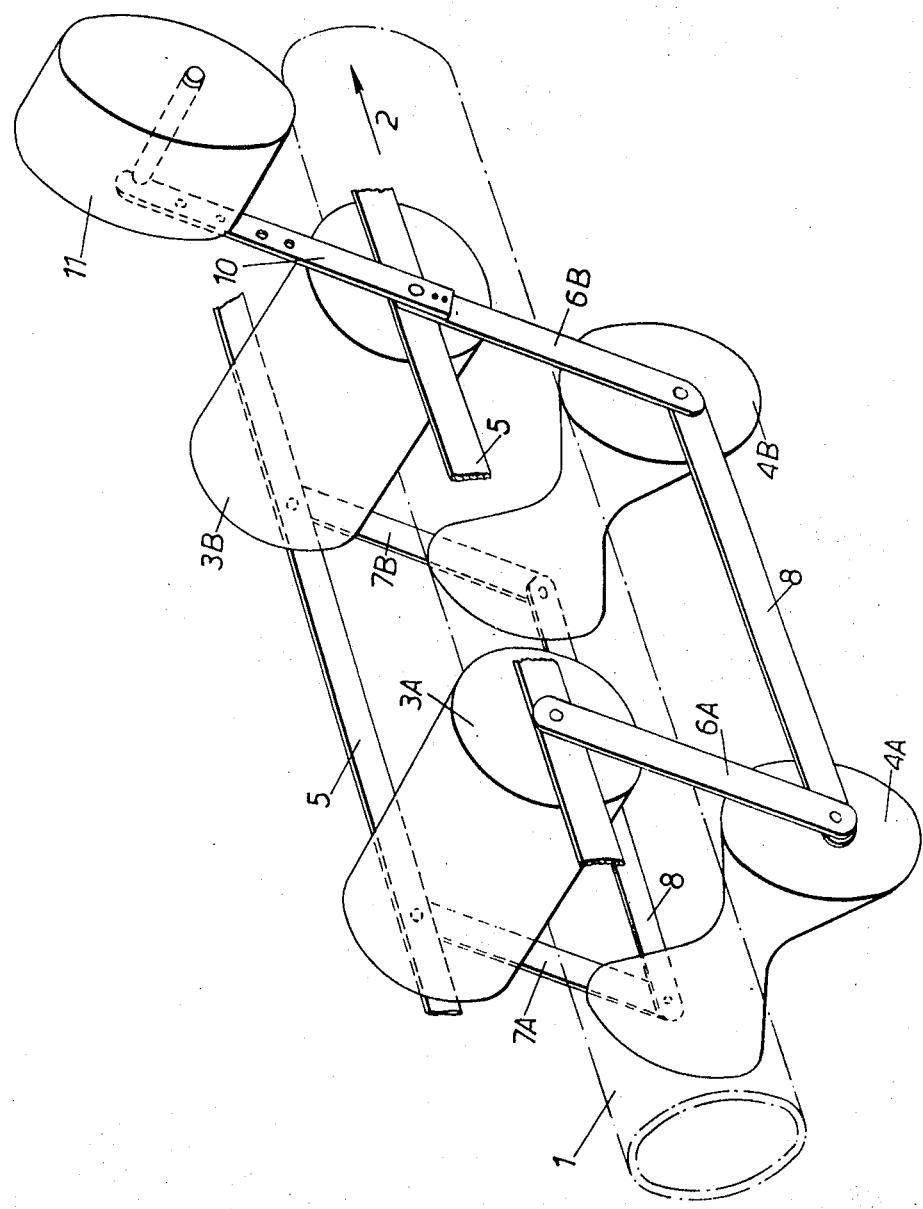
Harry Haller
Inventor
By Burns Doane
et al, His Attorneys

GLASS GRIPPING DEVICES

BACKGROUND OF THE INVENTION

1. Field of the Invention

This invention relates to a gripping device for gripping opposite surfaces of a moving body of glass.

2. Description of the Prior Art

Numerous applications arise in connection with the manufacture of glass in continuous lengths, for example glass tube or rod, in which it is desirable to grip opposite surfaces of the glass for guiding, supporting, driving or measurement purposes.

It is a main object of the present invention to provide a gripping device capable of guiding the glass without varying the position of the longitudinal axis thereof. For example, continuously moving glass tube may be cut into lengths by passing the glass tube through the center of a ring burner which moves with the tube and heats a defined area prior to the tube being cracked by contact with a chilling block, and it is important that the tube be guided centrally through the burner to ensure uniform heating.

A further object is to provide a gripping device which is capable of self-adjustment to accommodate changes in the thickness of the glass gripped thereby.

SUMMARY

The invention provides a gripping device for engaging opposite surfaces of a moving body of glass. Two pairs of rollers are supported for rotation about parallel axes which are substantially perpendicular to the direction of glass movement, and the ends of the rollers in each of the respective pairs are interconnected by tie members. The tie members are rotatable about respective pivot axes parallel to the roller axes, and biassing means act on the tie members to bias the latter in a common direction of rotation about said pivot axes so that opposite surfaces of a body of glass moving between the rollers are gripped between the roller pairs.

BRIEF DESCRIPTION OF THE DRAWING

The drawing shows a diagrammatic isometric view of a device for gripping a moving glass tube in accordance with the invention.

DESCRIPTION OF THE PREFERRED EMBODIMENT

Referring to the drawing, the gripping device is adapted to grip and support glass tubing 1 being fed in a continuous length to a tube-severing device (not shown) at which the tubing 1 is cut into lengths as required. The direction of movement of the tubing 1 is indicated by an arrow 2 and in this example is substantially horizontal.

The tube-severing device may be of any convenient form and may, for example, be of the kind described in Application Ser. No. 784421 filed 17th Dec. 1968. The glass tubing 1 is fed to the severing device by tractor means, usually in the form of driven feed rollers, spaced from the severing device. The severing impacts on the tubing 1 at the severing device give rise to a tendency for the glass tubing leaving the tractor means to undergo lateral displacement or 'bounce.' Such displacement is clearly undesirable as it leads to inaccuracy in the lengths into which the tubing is cut. It has also been found desirable to align the tube accurately in a horizontal direction, and for these reasons the gripping device shown in the drawing is arranged to engage the moving tubing 1 between the tractor means and the severing device to stabilize the horizontal and lateral positioning of the tubing and counteract any tendency for 'bounce.'

The gripping device comprises two pairs of rollers spaced apart horizontally in the direction of feed of the tubing 1, the axes of rotation of the rollers being horizontal and perpendicular to the said feed direction. The pair of rollers which is first encountered by the glass tubing 1, herein referred to as the upstream roller pair, comprises an upper roller 3A and a lower roller 4A. The other pair of rollers, herein referred to as the downstream pair, is substantially identical and comprises an upper roller 3B and a lower roller 4B.

The upper rollers 3A, 3B are rotatably supported in a fixed support, comprising in this example two parallel horizontal rails 5, part only of which are shown, in which opposite ends of the shafts or axles of the rollers 3A, 3B are supported.

Respective pairs of tie members 6A, 7A and 6B, 7B are pivotally connected to and interconnect adjacent axial ends of the rollers 3A, 4A and 3B, 4B respectively so that the lower rollers 4A, 4B are free to swing on the ends of the respective tie members about the axes of rotation of the respective upper rollers 3A, 3B.

Adjacent axial ends of the lower rollers 4A, 4B are interconnected by respective horizontal connecting links 8 which serve to maintain the tie members 6A, 6B and 7A, 7B respectively parallel to each other. In effect, therefore, the lower rollers 4A, 4B of each pair are 'floating' with respect to the fixed support rails 5.

One of the tie members, 6B in the illustrated example, is provided with an upward extension arm 10 projecting beyond the upper roller 3B and provided at its upper end with a counterweight 11 which is adjustable in position on the arm 10. When the tie member 6B and the extension arm 10 are inclined to the vertical, as shown, the moment exerted by the counterweight about the axis of the upper downstream roller 3B (about which the tie member 6B is pivoted) biases the tie members 6B, 7B (and, by virtue of the interconnections through the links 8, the tie members 6A, 7A) in a clockwise sense, as viewed in the drawing, about the axes of the respective upper rollers 3A, 3B.

In use of the device, the glass tubing 1 is passed between the rollers 3A, 4A and 3B, 4B of each pair successively. The previously described biassing by gravity of the tie members causes the lower rollers 4A, 4B to be urged upwardly into engagement with the lower surface of the glass tubing 1, forcing the tubing upwardly against the upper rollers 3A, 3B. In this way the tubing 1 is gripped between the two roller pairs 3A, 4A and 3B, 4B. The provision of two roller pairs spaced apart in the direction of glass movement and of identical construction ensures that the gripping of the tubing is not accompanied by any bending force on the tubing 1.

Conveniently, one of the rollers of each pair, in this example the lower 'floating' rollers 4A, 4B, have an outwardly concave or 'diabolo' surface profile in planes containing the respective roller axis to assist in centering the glass tubing 1 in a direction parallel to the roller axes. The upper rollers 3A, 3B may in this case be cylindrical.

The force with which the glass tubing 1 is gripped between the roller pairs can be adjusted by adjustment of the position of the counterweight 11 on the extension arm 10 and/or by selection of counterweights 11 of different masses.

In the embodiment described, the gripping device serves the purpose of accurately positioning the glass tubing 1 and maintaining the position of the latter relative to the support rails. Changes in the shape or diameter of the tubing are accommodated automatically by the gripping device by virtue of the self-adjusting nature of the parallelogram linkage constituted by the tie members 6A, 6B, 7A, 7B and the links 8.

Other applications of the gripping device, will, however, be readily apparent. For example, at least one of the rollers 3A, 4A 3B, 4B may be rotatably driven by any convenient means so as to assist in imparting longitudinal movement to the glass tubing 1.

Alternatively, the entire device may be mounted for rotation about a longitudinal axis coinciding with the axis of the tubing 1 so as to cause the tubing to rotate about its axis. Clearly for such an application an alternative means for biassing the tie members 6A, 6B, 7A, 7B, for example a biassing spring, would be necessary.

In a further application of the gripping device, means may be provided for measuring or indicating the inclination of one of the tie members 6A, 6B, 7A, 7B in order to provide an indication of the diameter of the tubing 1 passing through the device, or the thickness of any other continuous moving glass body passing through the device.

The device according to the invention is clearly suitable for gripping other moving glass bodies, such as rods or strips, and is not confined to the gripping of glass tubing, or to its association with a tube-severing device referred to herein.

Numerous possible modifications to the construction of the gripping device according to the invention will be apparent to those skilled in the art. Examples of such modifications are as follows:

a. the biassing counterweight 11 may be replaced by a suitable biassing spring.

b. the tie members 6A, 6B, 7A, 7B may be rotatable about parallel axes perpendicular to the axis of the tubing and intermediate the respective roller axes.

c. more than two pairs of interconnected rollers may be provided.

d. the rollers may be supported cantilever fashion on respective tie members such as 6A, 6B, so that the other tie members (7A, 7B) and the associated link 8, may be dispensed with.

e. the gripping device may be arranged to grip a glass body moving in any direction, including vertically, and f. the respective roller pairs may be biassed independently and the connecting link or links 8 dispensed with.

I claim:

1. A gripping device for engaging opposite surfaces of a moving body of glass in order to grip the moving body, comprising two pairs of glass-engaging rollers spaced apart in the direction of movement of the glass, the rollers of each pair being mounted on opposite sides of the path of travel of the glass and the rollers on one side of the path of travel being mounted for rotation about fixed axes, tie members pivotally connecting the ends of the rollers of each pair, at least one further tie member linking together the rollers on the other side of the path of travel, said further tie member being pivotally connected to said rollers on the other side of the path of travel on their respective axes, and biasing means connected to the tie members to bias the rollers on said other side of the path of travel towards that path and relative to the fixed axes of said rollers on said one side of the path of travel to grip the glass.

2. A device according to claim 1, wherein the rollers are mounted with their rotational axes horizontal, and the biasing means comprises a weighted extension attached to at least one of the said tie members to exert a turning moment on said tie members.

* * * * *